United States Patent [19]

Strattman

[11] Patent Number: 5,039,366

[45] Date of Patent: Aug. 13, 1991

[54] HARDWARE DEVICE CONNECTING STRIP

[75] Inventor: Joseph K. Strattman, Indianapolis, Ind.

[73] Assignee: Staytite Attachment Systems, Inc., Indianapolis, Ind.

[21] Appl. No.: 375,456

[22] Filed: Jul. 5, 1989

[51] Int. Cl.⁵ .............................................. E04B 2/00
[52] U.S. Cl. ...................................... 156/71; 24/304; 24/DIG. 11; 52/746; 72/324; 156/264; 156/265; 248/205.3
[58] Field of Search ......................... 156/71, 264, 265; 52/746; 248/205.3; 228/116; 72/324; 24/304, DIG. 11

[56] References Cited

U.S. PATENT DOCUMENTS

| | | | |
|---|---|---|---|
| 3,260,372 | 7/1966 | Jauslin | 248/205.3 |
| 3,899,803 | 8/1975 | Brumlik | 24/304 |
| 3,946,877 | 3/1976 | Galicia | 248/205.3 |
| 4,235,148 | 11/1980 | Menge | 72/324 |
| 4,281,786 | 8/1981 | Krueger | 228/116 |
| 4,367,819 | 1/1983 | Lewis | 248/205.3 |
| 4,457,053 | 7/1984 | Niwa | 248/205.3 |

FOREIGN PATENT DOCUMENTS 1078193  8/1967 United Kingdom .................. 24/304

Primary Examiner—John J. Gallagher
Attorney, Agent, or Firm—Baker & Daniels

[57] ABSTRACT

Device for connecting a plurality of hardware devices to a building surface. The device includes a plate having substantially coplanar front and back surfaces, and edges terminating between the planes defined by said surfaces. A plurality of substantially colinear hardware device attachment means are affixed to, and protrude from, the front surface of said plate. The plate is sufficiently thin so that it may be cut and separated between adjacent hardware device attachment means using a hand tool, to provide a set of a selected number of hardware device attachment means. Adhesive is applied to the back of the plate, which is then pressed against a wall, ceiling or any other surface to provide adhesion thereto.

11 Claims, 5 Drawing Sheets

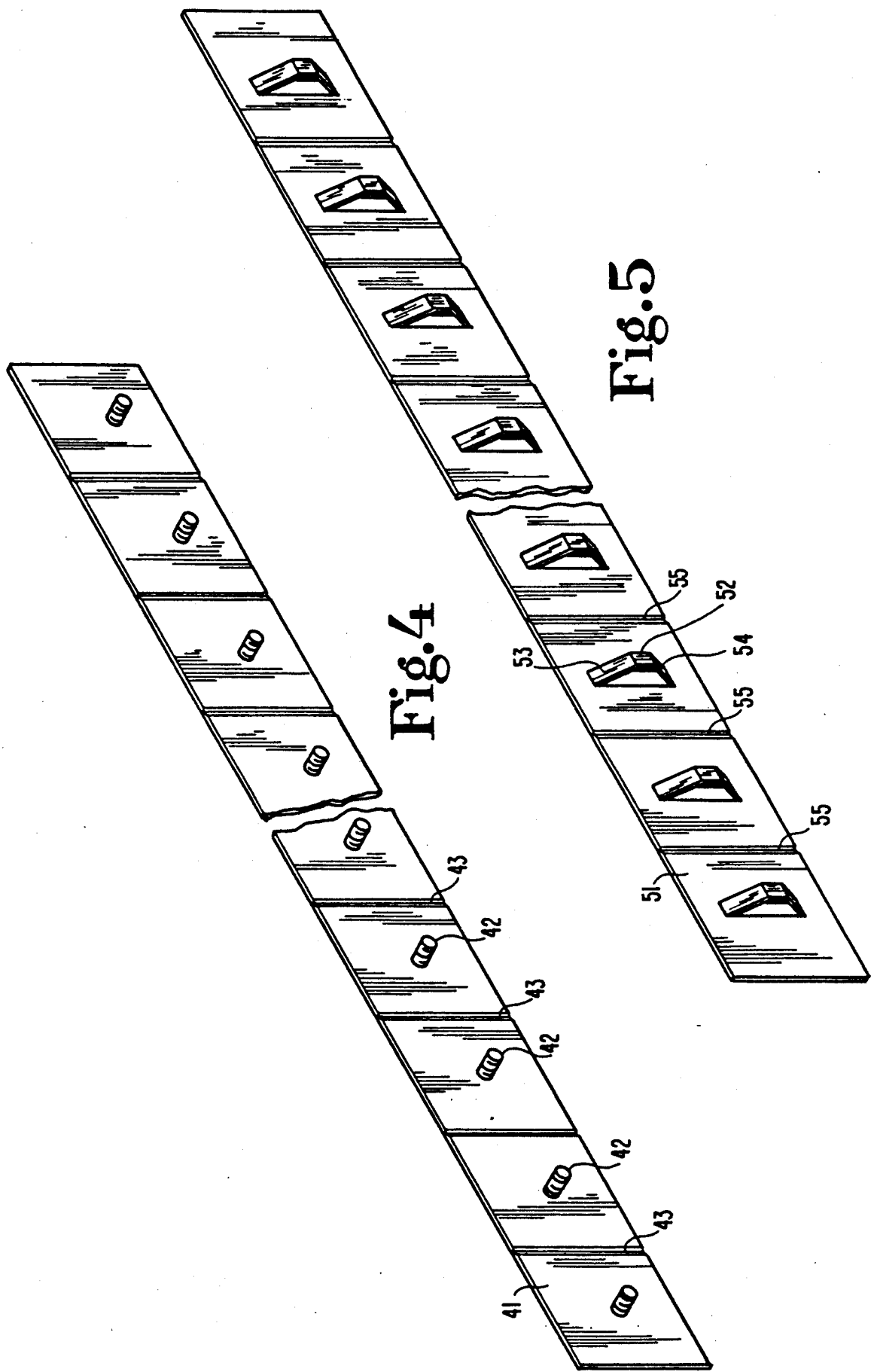

HARDWARE DEVICE CONNECTING STRIP

FIELD OF THE INVENTION

This invention relates to devices for connecting hardware devices such as conduit clamps and clips, one-hole straps, tie wire, plastic tie wraps and cable wire loops, to flat surfaces such as concrete, metal and wood walls and ceilings, with adhesive.

BACKGROUND OF THE INVENTION

In constructing or maintaining buildings, it is often necessary to securely affix conduit, cable, pipes and the like to flat surfaces such as walls and ceilings, by using various hardware devices. Examples of such hardware devices include, for example. conduit clamps and clips, one-hole straps, tie wires, rod couplings, plastic tie wraps and cable wire loops. It is typical to imbed some type of securing device in the substrate to which the hardware device is then attached. Examples of such securing devices include all types of masonary anchors, powder actuated pins and studs, toggle bolts, plastic anchors and screws.

Although imbedding such securing devices in the substrate generally provides a very secure attachment, there are a number of disadvantages to the use of such devices. First, such devices are usually expensive. Second, attachment of any of the foregoing requires the use of expensive power tools, powder activated tools and hand tools, some of which require a local power source. However, it is desirable to have as few power tools as possible on a construction site, as such tools are both expensive and subject to theft, and power sources are not always conveniently available.

Another shortcoming of such securing devices is that it usually takes 3-4 minutes to imbed each such device in the concrete. With ever-increasing labor costs, time-saving methods are more important.

Another shortcoming of using imbeddable securing devices is that, because each device is separately imbedded in the substrate, it can be difficult to align and space multiple devices.

It is known to directly attach certain hardware fixtures, such as electrical junction boxes, to a substrate by applying an adhesive to the back of the box and pressing it against the substrate. Uses of adhesive with various other hardware attachment systems are also shown in representative U.S. Pat. Nos. 4,778,702, 4,706,914, 4,682,748, 4,559,101, 4,390,576, 4,389,035, 4,338,151, 4,167,259, 4,025,015, 3,913,876, 3,880,535, 3,810,596, 3,809,799, 3,666,225, 3,659,319, 3,559,933, 3,542,321, 3,482,809, 2,580,231, 2,385,296. However, the devices disclosed in these patents are generally costly to manufacture, of insufficient strength, and do not allow for automatic alignment and spacing of multiple hardware devices.

Several devices for providing attachment and/or alignment of multiple cables or conduits to a surface at once are known. Patents disclosing such devices include U.S. Pat. Nos. 4,770,378, 4,395,009, 3,944,176, 3,917,202, 3,730,242, 3,633,857, 3,576,305, 3,347,505, 3,339,870, 2,535,427 and 2,470,814. However, none of these patents discloses a device which allows a worker to cut a predetermined number of attachment devices from a strip using only a hand tool such as tin snips.

OBJECTS OF THE INVENTION

One object of the invention is to provide a strip containing a plurality of hardware connection devices which may be easily cut using metal snips to provide a strip of a desired number of connecting devices.

Another object of the invention is provide a device for connecting hardware devices to building surfaces without penetrating the surface.

Another object of the invention is to provide a device that will assist in aligning and spacing the placement of hardware devices against a surface.

Still other objects and advantages of the invention will become apparent to those of skill in the art after reading the following description of a preferred embodiment.

SUMMARY OF THE INVENTION

The invention comprises a device for connecting a plurality of hardware devices to a building surface. The device includes a plate having substantially coplanar front and back surfaces, and edges terminating between the planes defined by said surfaces. A plurality of substantially colinear hardware device attachment means are affixed to, and protrude from, the front surface of said plate. The plate is sufficiently thin so that it may be cut and separated between adjacent hardware device attachment means using a hand tool, to provide a set of a selected number of hardware device attachment means. Adhesive may be applied to the back of the plate, which is then pressed against a wall or ceiling to provide adhesion thereto.

The hardware device attachment means may consist of, for example, an externally threaded stud or a bracket extending from the plate. In the case of brackets, the brackets may be formed from the plate, and may have their midlines perpendicular to the longitudinal midline of the plate. This construction allows a plurality of parallel cables to be secured to the device using tie wires.

BRIEF DESCRIPTION OF THE DRAWINGS

FIG. 4 is a perspective view of a strip of the invention in which the hardware device attachment means consist of externally threaded studs.

FIG. 5 is a perspective view of the a strip of the invention in which the hardware device attachment means consist of brackets.

DETAILED DESCRIPTION OF THE PRESENT INVENTION

Figure 1:
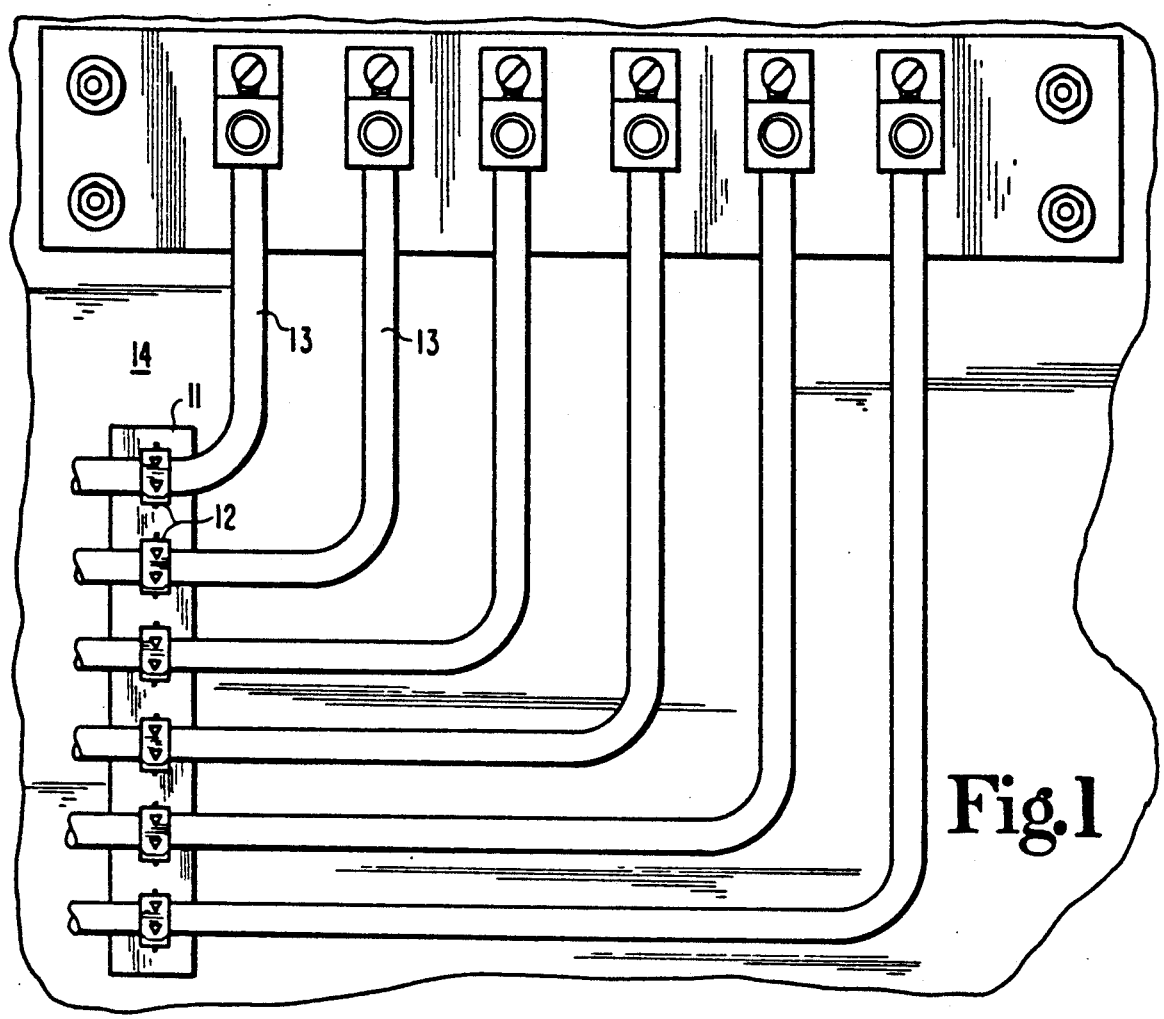
FIG. 1 is a front view showing a strip of the invention used with conduit clamps to align, space and connect several electrical cables to a wall.

FIG. 1 is a a front view showing a strip of the invention used with conduit clamps to align, space and secure several electrical cables to a wall. Strip 11 includes externally threaded studs (not visible) extending from its front side. Each stud has a conduit clamp 12 bolted onto it to secure a cable 13.

The strip is secured to wall 14 by adhesive placed on the back of strip 11. As all the threaded studs extend from a single plate, all may be simultaneously secured to the wall at once, instead of drilling separate holes into the concrete for each stud as in the prior art. The adhesive used should provide a high initial tack. A suitable adhesive is, for example, Leech F-26, available from Leech Products, Inc., of Hutchinson, Kans., which should be applied to the device of the invention according to the manufacturers instructions. This adhesive should cure in about 24 hours in temperatures above 70 deg. F., and in about 48 hours at temperatures below 60 deg. F.

It may be appreciated from FIG. 1 that all the conduit clamps 12 may be aligned and equally spaced, thus creating a more professional installed appearance.

Figure 2:
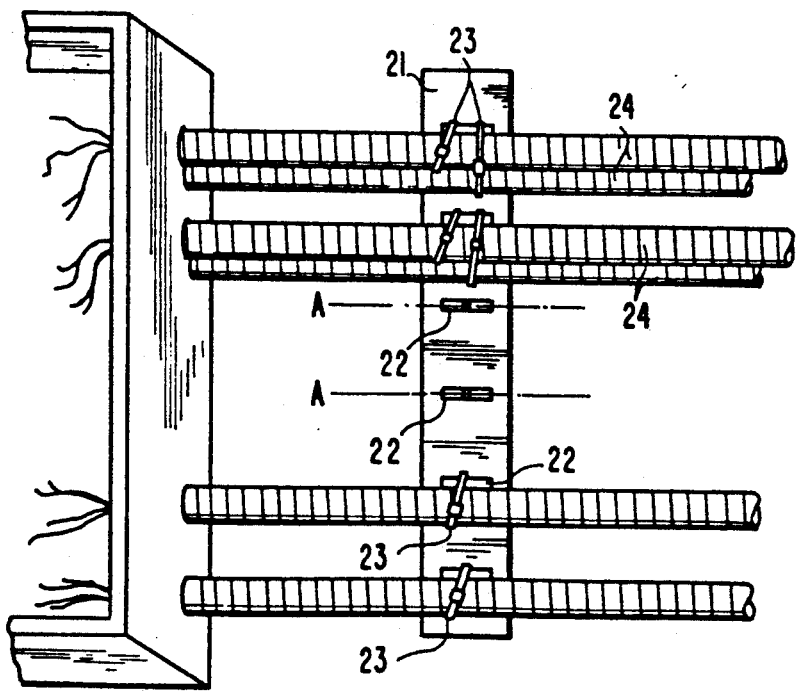
FIG. 2 shows a bracketed strip of the invention, used with tie wires to align and space several metal-clad conduits to a wall.

FIG. 2 shows a bracketed strip of the invention, used with tie wires to align and space several metal-clad conduits to a wall. Strip 21 includes brackets 22, which are substantially colinear and parallel. As each bracket includes a portion spaced from the strip 21, wire ties 23 may be passed through brackets 22 to secure metal-clad conduits 24 to the brackets. The brackets are oriented on the strip so that the midline A of each bracket is perpendicular to the longitudinal midline of strip 21. This allows each wire tie 23 to hold a metal-clad conduit in a position perpendicular to the midline of strip 21.

Figure 3:
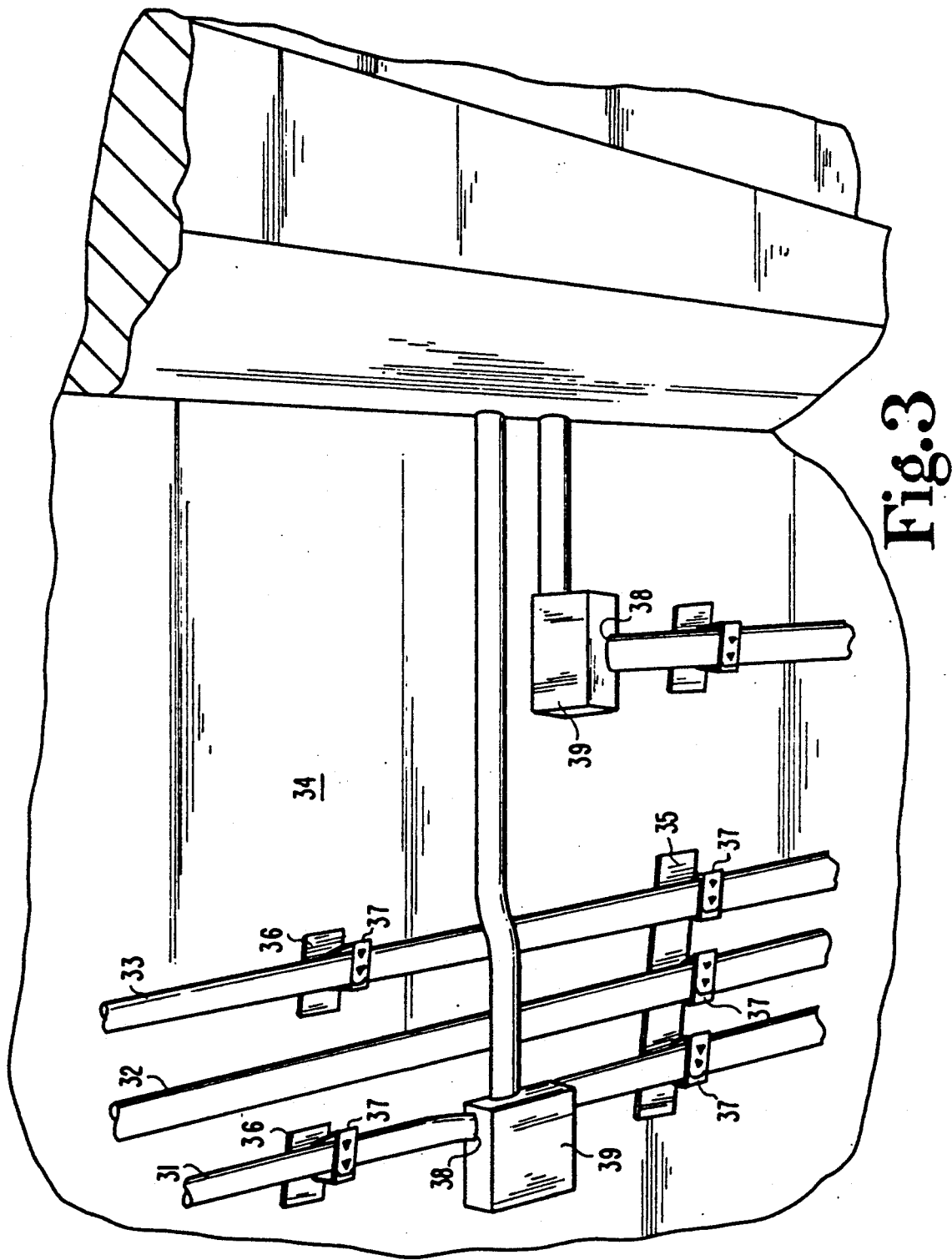
FIG. 3 shows the use of several connecting devices of the invention to secure a set of conduits to a ceiling.

FIG. 3 shows the use of several connecting devices of the invention to secure a set of conduits to a ceiling. Conduits 31, 32 and 33 may be secured to ceiling 34 by either a strip 35 version of the invention, or by individual devices 36. Conduit clamps 37 hold conduit 31, 32 and 33 in a manner slightly spaced from ceiling 34 to match the pre-stamped conduit receiving areas 38 of junction boxes 39.

FIG. 4 is a perspective view of a strip of the invention in which the hardware device attachment means consist of externally threaded studs. In one version of the invention, a four foot strip 41 is provided having colinear, equally spaced externally threaded studs 42 extending from the front surface. To manufacture such a strip, 20-gauge galvanized cold rolled steel, 0.040 in. thick, is cut into a 2×48 inch strip. Twenty-four ¼-inch holes, 2 inches apart, are punched from the midline of the strip. A ¼ in.×20, ⅜ in. long, hardened threaded stud, having a serrated shoulder, is placed into each hole, then driven into the hole with an 8 ton punch press. Driving the stud into the hole causes the strip metal to flow into the serrations of the stud shoulder, creating a cold weld and firmly affixing the stud in the strip. Studs are secured in the remaining holes in the same manner.

At a construction site, a worker may decide how many hardware devices need to be secured at a particular location, and cut from a long strip a shorter strip having the required number of studs. Because the strip comprises a plate with substantially coplanar front and back surfaces, the cutting may be performed using a hand tool such as tin snips. The strip may then be adhesively secured to the building wall or ceiling as described above. It may also be appreciated, as evidenced by FIG. 2, that not every hardware connecting device in a strip needs to be used.

FIG. 5 is a perspective view of the a strip of the invention in which the hardware device attachment means consist of brackets. This version of the invention may be made by first providing a rigid material such as 20-gauge. galvanized cold rolled steel 0.040 in. thick, and cut into a 2×48 inch strip. A die is provided which has a flat top portion and two opposing tapered sides extending from said top portion at an obtuse angle. The two remaining opposing sides of the die extend perpendicularly from the top portion of the die. In an 8-ton punch press, the portion of the strip above the die is then driven toward the die, resulting in the formation in the strip of the trapezoidal shaped bracket shown in FIG. 5. In one embodiment of the invention, each bracket in a strip includes a 174-in. long center top portion 52 parallel with the surface of the strip, and two opposing side portions 53 and 54, each extending toward and joining the strip at an obtuse angle. This method of manufacture provides an extremely durable, functional and low-cost strip of brackets to be provided. The trapezoidal shape of each bracket is believed to be superior to a curved or triangular bracket, because it provides an even portion to which a wire tie may be secured, whereas curved or triangularly shaped brackets have a tendency to cut wire ties and allow the tie wire to move on the bracket.

Figure 6:
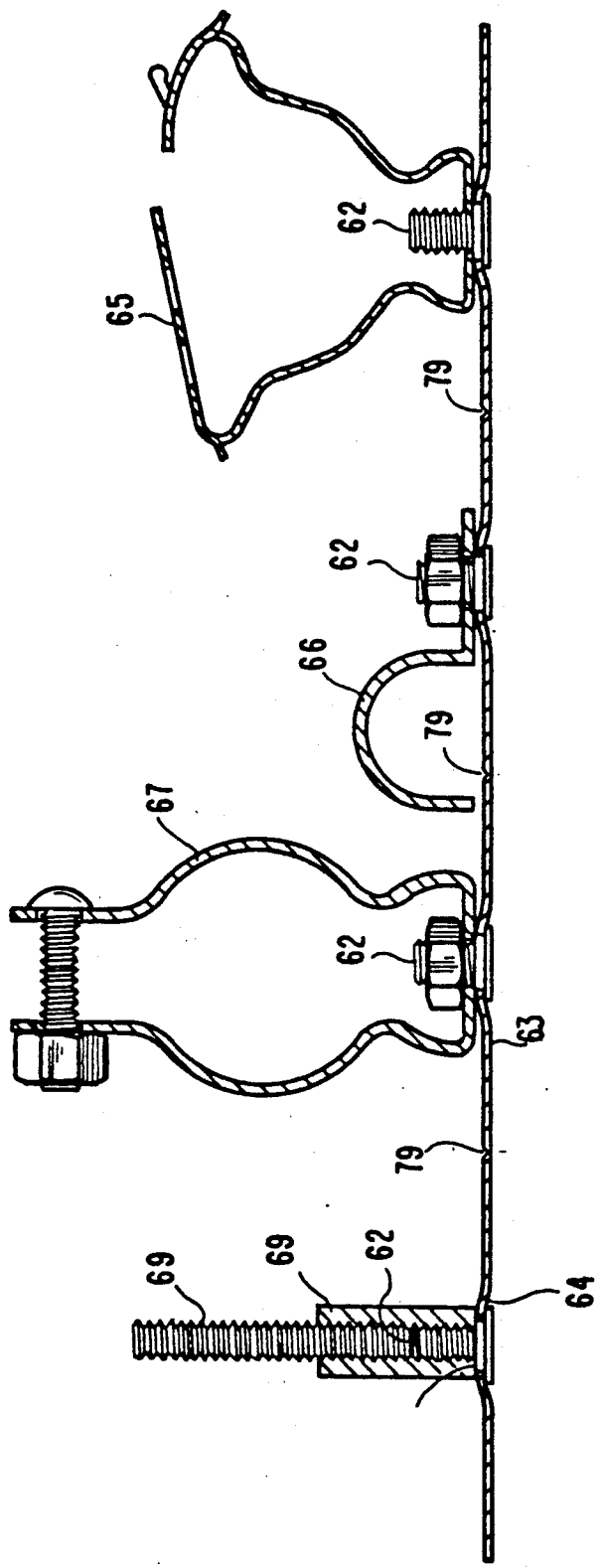
FIG. 6 is a full sectional view of a strip shown in FIG. 4 with several types of hardware devices affixed thereto.

FIG. 6 is a full sectional view of a strip shown in FIG. 4 with several types of hardware devices affixed thereto. In this view, it is possible to see the serrated shoulder portion 61 of each threaded stud 62, as described above. It may also be appreciated that the back side 63 of each strip is substantially planar, although a slight depression 64 exists at the location where each stud is stamped into the plate.

Examples of hardware devices which may be attached to the externally threaded studs 62 include conduit clip 65, one hole strap 66, and conduit clamp 67. Rod coupling 69 may also be screwed onto a stud to create, in effect, and internally threaded stud. Threaded rod 69 may be screwed into the opposite end of rod coupling 68 to allow hardware devices to be connected at a point further from the plate.

Figure 7:
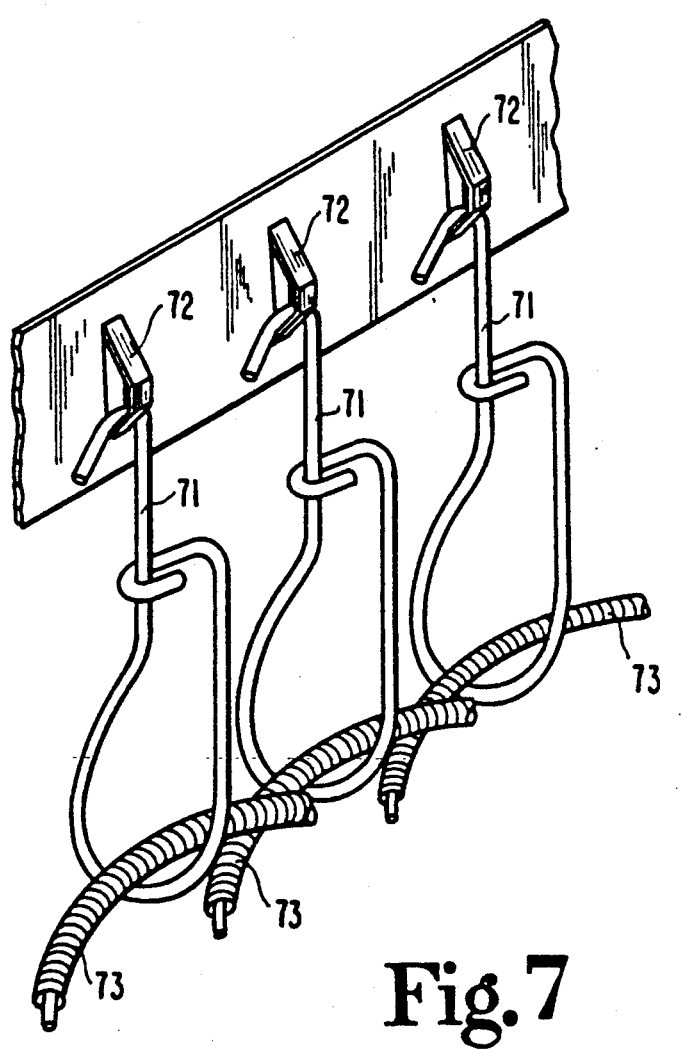
FIG. 7 is a perspective view of a strip of the invention used to suspend several caddy cable wire loops which hold metal-clad conduit.

FIG. 7 is a perspective view of a strip of the invention used to suspend several caddy cable wire loops which hold metal-clad conduit. As shown, a bracketed version of the invention may be adhesively secured to a ceiling, and caddy cable wire loops 71 suspended from individual brackets 72. Metal-clad conduit 73 may be supported by loops 71.

The devices of the invention may be made from material other than metal, such as plastic. However, the material used should be of sufficient strength to bear the load placed on the attachment device. In addition, it is possible to score the strips between adjacent hardware device connecting means, as shown at 43 in FIG. 4, 55 in FIG. 5, and 79 in FIG. 6. These scores may be easily made using the same press used to form the stud holes or brackets. The scores allow one to break a strip at a desired interval by bending the strip back and forth along the score until the metal fatigues and breaks.

It will be appreciated that one embodiment of the invention may comprise a device for connecting a plurality of hardware devices to a building surface comprising: a plate having substantially coplanar front and back surfaces, and edges terminating between the planes defined by said surfaces; and a plurality of substantially colinear hardware device attachment means affixed to and protruding from the front surface of said plate, such that said plate may be cut and separated between adjacent hardware device attachment means using a hand tool, to provide a set of a selected number of hardware device attachment means, the attachment means comprising rigid brackets which are formed from and extend from said plate to thereby define a gap between said bracket and the front planar surface of said plate, each of said brackets having first and second ends, each of said first and second ends being connected to said plate and to each other by an intermediate bracket portion, such that the plate has a hole therethrough from the portion from which each bracket is formed.

Another embodiment of the invention may a device for connecting a plurality of hardware devices to a building surface comprising a strip structure having a substantially planar back surface, and a plurality of substantially colinear, parallel brackets extending from said strip structure, each such bracket including a portion spaced from said strip structure, each such bracket having a first and second end and each of said ends being connected to said plate and to each other by an intermediate bracket portion, such that the plate has a hole below each bracket, and such that the midline of said brackets are substantially parallel to each other, and each such midline is substantially perpendicular to the longitudinal midline of said strip structure.

Many other changes could be made in the above construction and many apparently widely different embodiments of this invention could be made without departing from the scope thereof, and it is intended that all matter contained in the above description or shown in the accompanying drawings shall be interpreted as illustrative and not in a limiting sense.

I claim:

1. A device for connecting a plurality of hardward devices to a building surface comprising:
    a plate having substantially copolanar front and back surfaces, and edges terminating between the planes defined by said surfaces; and
    a plurality of substantially colinear hardware device attachment means affixed to and protruding from the front surface of said plate, such that said plate may be cut and separated between adjacent hardware device attachment means using a hand tool, to provide a set of a selected number of hardware device attachment means, the attachment means comprising rigid brackets which are formed from and extend from said plate to thereby define a gap between said bracket and the front planar surface of said plate, each of said brackets having first and second ends, each of said first and second ends being connected to said plate and to each other by an intermediate bracket portion, such that the plate has a hole below each bracket.

2. The device of claim 1 wherein said brackets include a portion parallel with the plate.

3. The device of claim 1 further comprising a tie wire inserted through each bracket.

4. The device of claim wherein said hardware device attachment means are equally spaced.

5. A method for connecting a plurality of hardware devices to a substantially flat surface, comprising,
    providing a device as set forth in claim 1,
    applying adhesive to the back surface of the connecting device.
    pressing the back of the device against flat surface to provide adhesive securing thereto, and connecting the plurality of hardware devices to the attachment means of the connecting device.

6. A device for connecting a plurality of hardware devices to a building surface comprising:
    a strip structure having a substantially planar back surface, and
    a plurality of substantially colinear, parallel brackets extending from said strip structure, each such bracket including a portion spaced from said strip structure, each such bracket having a first and second end and each of said ends being connected to said plate and to each other by an intermediate bracket portion, such that the plate has a hole below each bracket, and such that the midline of said brackets are substantially parallel to each other, and each such midline is substantially perpendicular to the longitudinal midline of said strip structure.

7. The device of claim 6, wherein said strip structure comprises a plate having substantially copolanar front and back surfaces, and edges terminating in the planes defined by said surfaces.

8. The device of claim 6 wherein said plate may be cut and separated between adjacent brackets using hand tools.

9. The device of claim 6, wherein each bracket is integrally formed from said body.

10. The device of claim 6, wherein said strip may be cut and separated between adjacent brackets using a hand tool to provide a strip having a selected number of brackets.

11. A method for connecting a hardware device to a substantially flat surface, comprising,
    providing a device as set forth in claim 6,
    applying adhesive to the back surface of the connecting device,
    pressing the back of the device against flat surface to provide adhesive securing thereto, and
    connecting the plurality of hardware devices to the brackets of the connecting device.

* * * * *